United States Patent [19]
Jungbluth et al.

[11] 3,715,503
[45] Feb. 6, 1973

[54] AUTOMATIC TRANSFER ARRANGEMENT FOR TELEPHONE SYSTEM

[75] Inventors: Ernest J. Jungbluth, Penfield, Paul K. Kavanaugh, Webster, Frederick H. Gardner, Penfield, all of N.Y.

[73] Assignee; Stromberg-Carlson Corporation, Rochester, N.Y.

[22] Filed: Feb. 16, 1971

[21] Appl. No.: 115,310

[52] U.S. Cl........179/15 BF, 179/175.2 R, 179/175.3
[51] Int. Cl.................................................H04j 3/14
[58] Field of Search.................179/15 BF, 15 AD, 15 AC, 179/175.2 R, 175.3, 175.31 R, 175.25

[56] References Cited

UNITED STATES PATENTS

| | | | |
|---|---|---|---|
| 2,680,162 | 6/1954 | Brehm | 179/175.3 |
| 3,603,736 | 9/1971 | Morroll | 179/15 BF |
| 3,457,373 | 7/1969 | Van Duhren | 179/15 BF |
| 3,458,661 | 7/1969 | Forde | 179/15 AL |
| 3,519,935 | 7/1970 | Hochgraf | 179/15 AL |
| 3,519,750 | 7/1970 | Beresin | 179/15 AL |
| 3,569,632 | 3/1971 | Beresin | 179/15 AL |

*Primary Examiner*—Kathleen H. Claffy
*Assistant Examiner*—David L. Stewart
*Attorney*—Hoffman Stone et al.

[57] ABSTRACT

Logic circuitry for automatically substituting a spare trunk line in place of a normal one in response to an alarm signal generated at one or both of the central offices connected by the lines. The spare line is continually monitored, and if a fault develops on it, it is locked out of service.

3 Claims, 8 Drawing Figures

INVENTORS
FREDERICK H. GARDNER
ERNEST J. JUNGBLUTH
PAUL K. KAVANAUGH
BY
ATTORNEY

INVENTORS
FREDERICK H. GARDNER
ERNEST J. JUNGBLUTH
PAUL K. KAVANAUGH
BY
Hoffman Stone
ATTORNEY

INVENTORS
FREDERICK H. GARDNER
ERNEST J. JUNGBLUTH
BY PAUL K. KAVANAUGH

Hoffman Stone
ATTORNEY

INVENTORS
FREDERICK H. GARDNER
ERNEST J. JUNGBLUTH
PAUL K. KAVANAUGH
BY
Hopgood Stone
ATTORNEY INVENTORS
FREDERICK H. GARDNER
ERNEST J. JUNGBLUTH
PAUL K. KAVANAUGH
BY Hoffman Stone
ATTORNEY

INVENTORS
FREDERICK H. GARDNER
ERNEST J. JUNGBLUTH
PAUL K. KAVANAUGH

BY Hoffman Stone
ATTORNEY

INVENTORS
FREDERICK H. GARDNER
ERNEST J. JUNGBLUTH
PAUL K. KAVANAUGH
BY [signature]
ATTORNEY

AUTOMATIC TRANSFER ARRANGEMENT FOR TELEPHONE SYSTEM

BRIEF DESCRIPTION

This invention relates to a novel arrangement for responding to alarm signals at telephone switching terminals, and automatically switching signal transmission form a regular trunk line to a spare line in response to an alarm generated at either of the terminals.

A great deal of telephone signal transmission between switching exchanges is done on a multiplex basis, with the communications channels separated either by frequency division or by time division. Multiplexing is economical because the cost of the equipment needed for it is generally considerably less than the cost of the additional wire that would be needed if a separate trunk line were to be installed for each channel.

Many, or most, multiplexing systems include arrangements for constantly monitoring the lines and generating alarm signals in response to the occurrences of faults. Usually, one or more of the lines connecting a pair of exchanges are designated spare lines, and the rest normal lines, and personnel are kept available to respond to an alarm signal to switch a spare line into service in place of a normal line that has developed a fault.

This arrangement is tolerable in large exchanges where the cost of continuous manning can be justified. In small exchanges, however, continuous manning cannot be justified, yet it is still highly desirable to avoid loss of traffic capacity for appreciable intervals.

The principal object of the invention, therefore, is to provide equipment capable of responding automatically to an alarm condition on any line on an assigned route to switch the transmission from the affected line to a spare line, thereby avoiding loss of service even through the exchanges are not manned. The system of the invention is also believed to be of advantage in manned exchanges because of the speed with which it works. When response to an alarm must be attended to manually, there is necessarily a long delay between the start of the alarm and the corrective action. All channels on the affected line usually suffer disconnect and remain out of service for at least a few seconds. With the equipment of the invention, by contrast, the channels are switched to the spare line quickly enough to avoid disconnect and with only insignificant loss of service, at least in respect of ordinary voice signal transmission.

Briefly, the invention pertains to a logic circuit arranged to operate in response to an alarm to shift the service on an affected line to a spare line on the route. Several interlock and checking features are included. Provision is made that if the alarm persists after the transfer, indicating that the trouble is more likely in one of the terminal equipments and not in the normal line itself, the service is returned to the normal line and the spare line is kept available thereafter to substitute for one of the other normal lines on the route.

A presently preferred embodiment of the invention will now be described in connection with the accompanying drawings, wherein:

FIGS. 1A and 1B, juxtaposed with FIG. 1B to the right of FIG. 1A, constitute a simplified schematic diagram, largely in block form, illustrating the basic principles of the invention;

FIGS. 2A, 2B, 2C, and 2D, taken together and arranged as shown in FIG. 3, constitute a schematic diagram of a logic circuit according to the presently preferred embodiment of the invention;

The invention arose in connection with the development of a time divided multiplex system of the kind known as T-carrier, in which each trunk line includes two pairs of wires for directional discrimination, and the embodiment described herein is arranged for use in a signal transmission system of that type. It will be recognized, however, that the invention may be readily adapted for use in any signalling system that includes a spare transmission path and means for generating alarm signals at the terminals in response to the occurrence of faults in transmission.

To avoid confusion, the terminology used in this application will be briefly described in connection with a very brief summary of the principle features of T-carrier systems.

A T-carrier system operates between two switching exchanges to multiplex on a time division basis typically 24 communication channels on two pairs of conductors extending between the exchanges. One exchange transmits over one of the pairs and the other over the other pair of conductors. The connection between exchange A and exchange B is designated a route, and the two pairs of wires, together with their repeaters spaced along the route and repeaters located at the exchanges are designated a span line. Ordinarily, several span lines are provided on each route, including one or more spare span lines.

Signal transmission is in digital form, and at least supervisory and synchronizing signals are transmitted constantly whether or not customers are being served. The terminal equipments include detectors arranged to supervise all span lines continually and to produce alarm signals if things are not as they should be. Ordinarily, the alarm signals are used to alert maintenance personnel at the exchanges, and the personnel are relied on to take corrective action. The usual procedure is to switch the spare span line into service in place of of the normal span line where the alarm was produced and then to restore the affected span line.

Figure 1A:
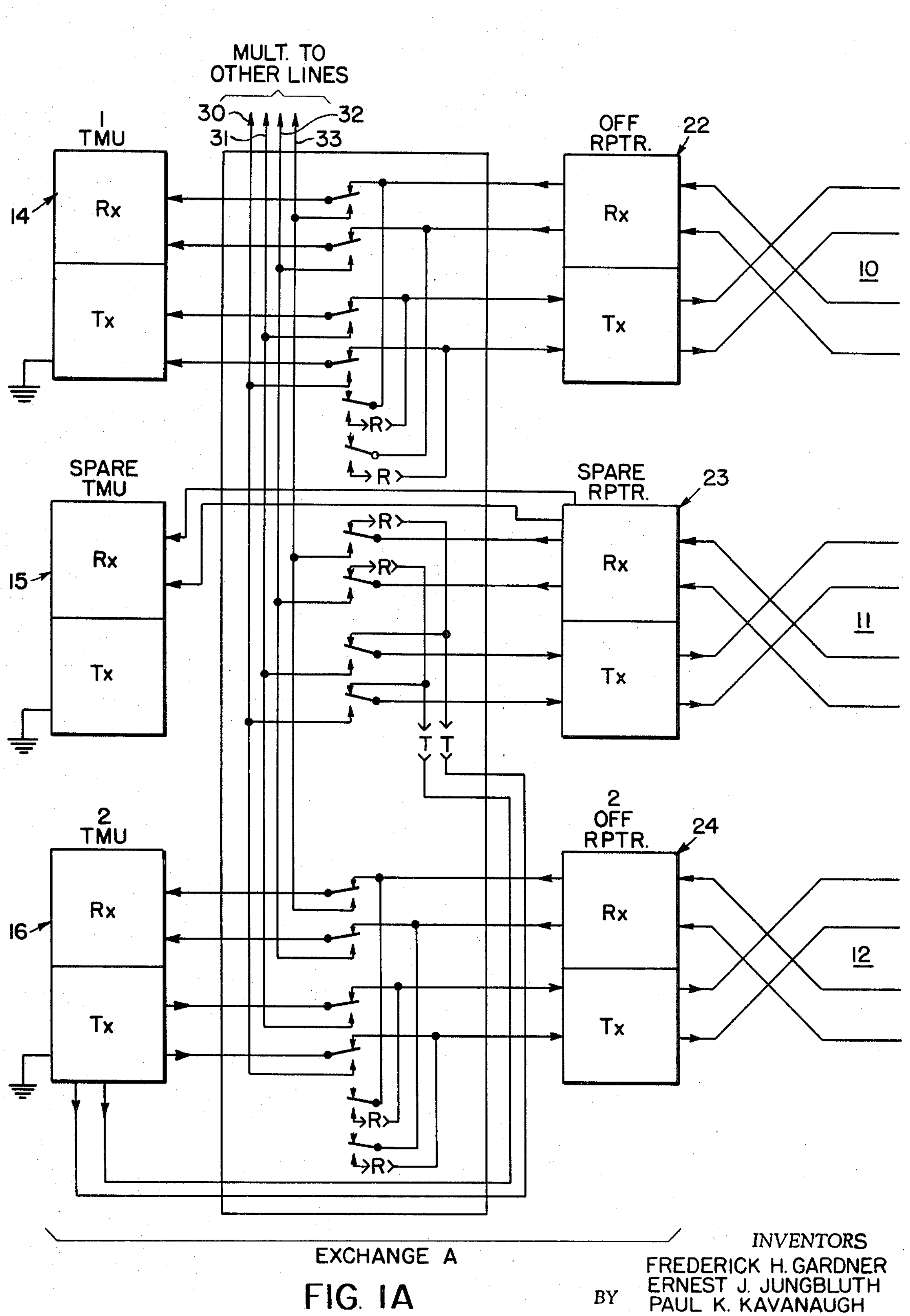
Figure 1B:
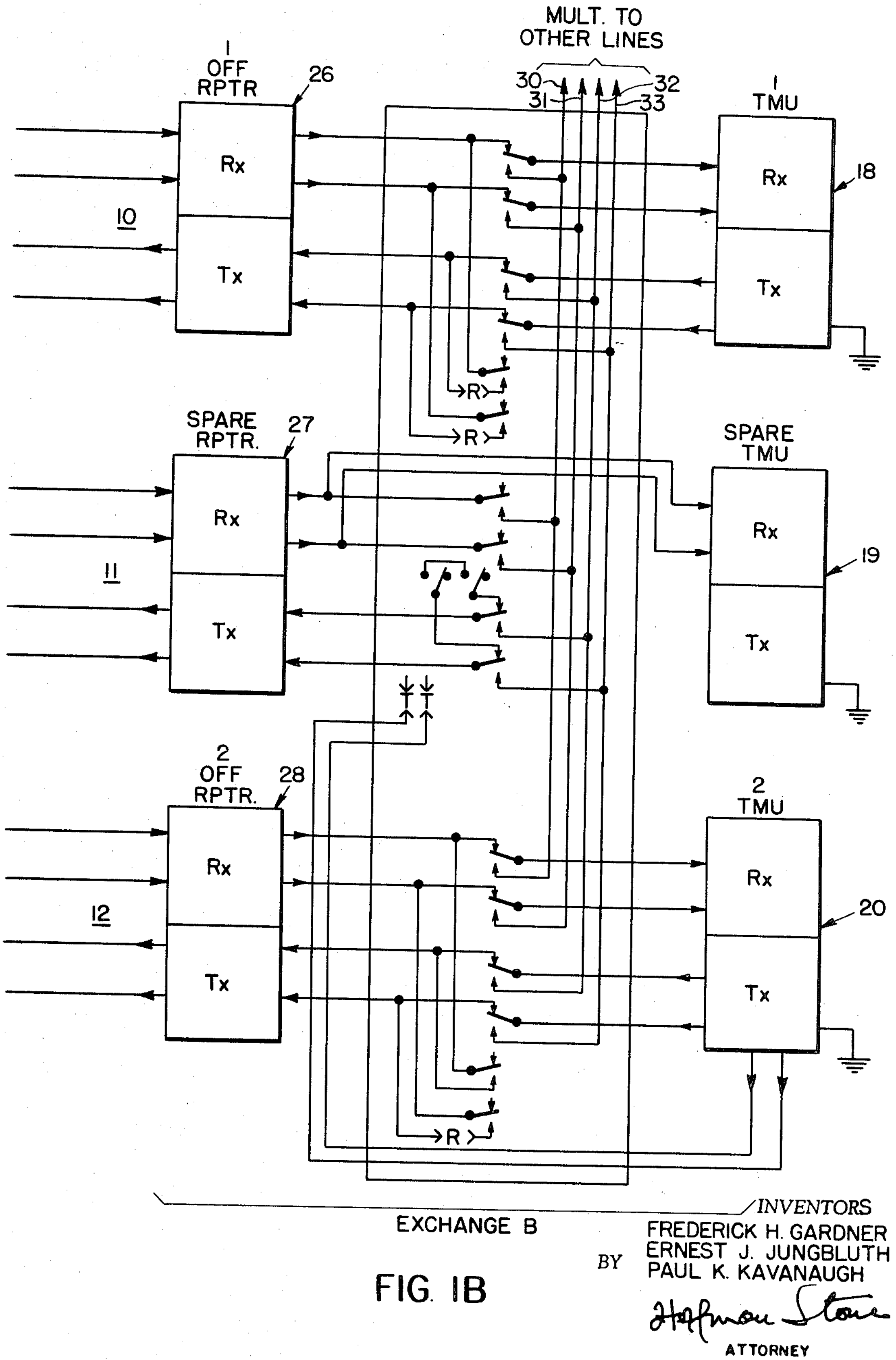

The logic circuitry of the invention is schematically outlined in block form in FIGS. 1A and 1B, which show three span lines 10, 11, and 12 assigned to a route between exchange A and exchange B. Each T-carrier multiplex equipment at the exchange includes a terminal matching unit 14, 15 and 16 at exchange A, and 18, 19, and 20 at exchange B for coupling the span line 10-12 to the common equipment at the exchange. A separate office repeater 22, 23, 24, and 26, 27, and 28, respectively, is provided for each of the lines 10–12, connecting the lines to the terminal matching units 14–16, and 18–20, respectively. The office repeaters 22–24 and 26–28 include error detectors (not shown) which produce provisional alarm signals if they detect a lack of signals or a violation of the alternate polarity rule for the pulses on the respective span lines 10–12. The alarm signals produced in the office repeaters are forwarded by connections (not shown) to the respective terminal matching units 14–16 and 18–20, where they are integrated and used to produce so-called system alarm signals if they persist for a predetermined time such as, for example, 10 to 100 milliseconds. The system alarm signals, in turn, are relayed to common equipment in the exchange to generate a so-called carrier group alarm (CGA) if they persist long enough, say a few hundred milliseconds.

In the system as shown, the top and bottom span lines 10 and 12 are designated the normal span lines, and the middle line 11 is designated the spare span line. Under normal conditions, only the normal span lines 10 and 12 are used for communications, and the spare span line 11 is held in reserve, on stand-by, for use in case one of the normal span lines 10 and 12 experiences trouble. The switching scheme for substituting the spare span line 11 in place of one of the normal span lines is indicated between the terminal matching units and the office repeaters at the two exchanges. The system operates in response to alarm signals indicating faulty operation on one of the normal lines 10 and 12 to switch the terminal matching units 14 and 18, or 16 and 20 to respective sets of buses 30, 31, 32, and 33, and 30', 31', 32', and 33', respectively, disconnecting them from their normally assigned office repeaters. Simultaneously, the spare span line 11 is disconnected from the spare terminal matching units 15 and 19, and its office repeaters 23 and 27 are connected through the relay contacts indicated to the buses 30–33, and 30'–33πo·

In the T-carrier system as in many other multiplexing systems, the occurrence of an alarm at one terminal causes the immediate transmission of a special signal to the other terminal, in response to which the other terminal also generates an alarm signal. The alarm signals, therefore, are generated practically simultaneously at both terminals, and the logic operations in the circuits of the invention are carried out at both terminals almost simultaneously. Appropriate delays are included in the logic to allow for signal transmission times, reaction times of the various circuit components, and for synchronization, as described hereinafter.

Simultaneously with the switching of the span lines, the receiver section of the office repeater of the affected normal span line at one of the exchanges is connected to its transmitter section, looped around so that the output of the receiver constitutes the input of the transmitter, allowing fault detection to be carried out at the other exchange without the need for personnel at both exchanges.

The looping is determined by the strap connections designated R and T, respectively. If the line is to be looped the R straps are connected, if not, the T straps. Similar straps are also provided for the spare span line so that while it is on standby it operates as a closed loop, transmitting signals taken from an arbitrarily selected one of the normal terminal matching units, and receiving the same signals after they have traversed the spare line in both directions.

If, after the spare span line is switched into service, the alarm condition persists for longer than about 1 second, it is assumed that the trouble was not in the normal span line, but in the terminal equipment. The logic then operates to undo the emergency switching and to restore the normal span line to service, thereby releasing the spare span line and making it available as a substitute for the second normal span line. A lockout is provided to deny the originally troubled span line renewed access to the spare span line until after a manual reset switch has been actuated.

Figure 2A:
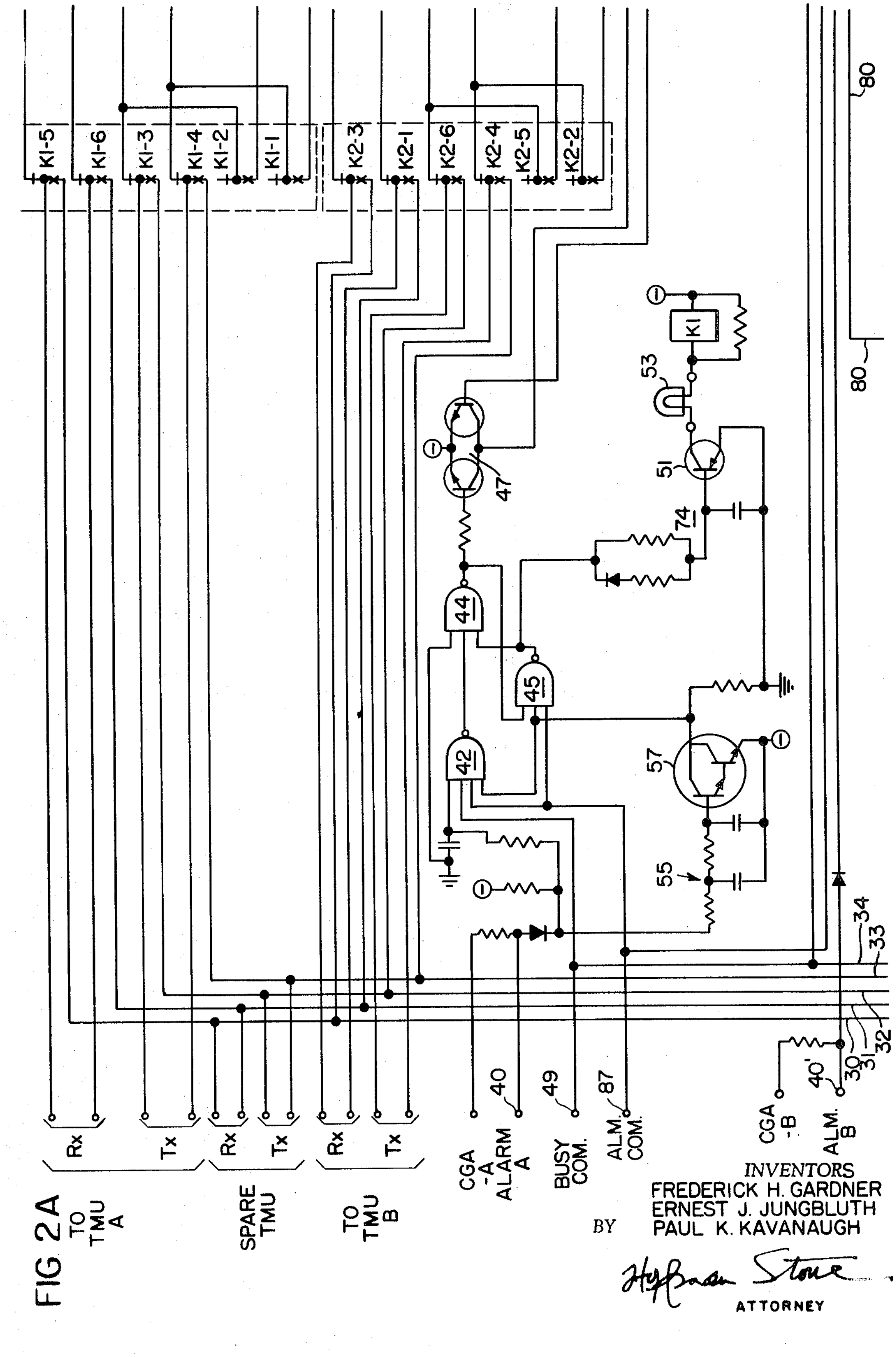
Figure 2B:
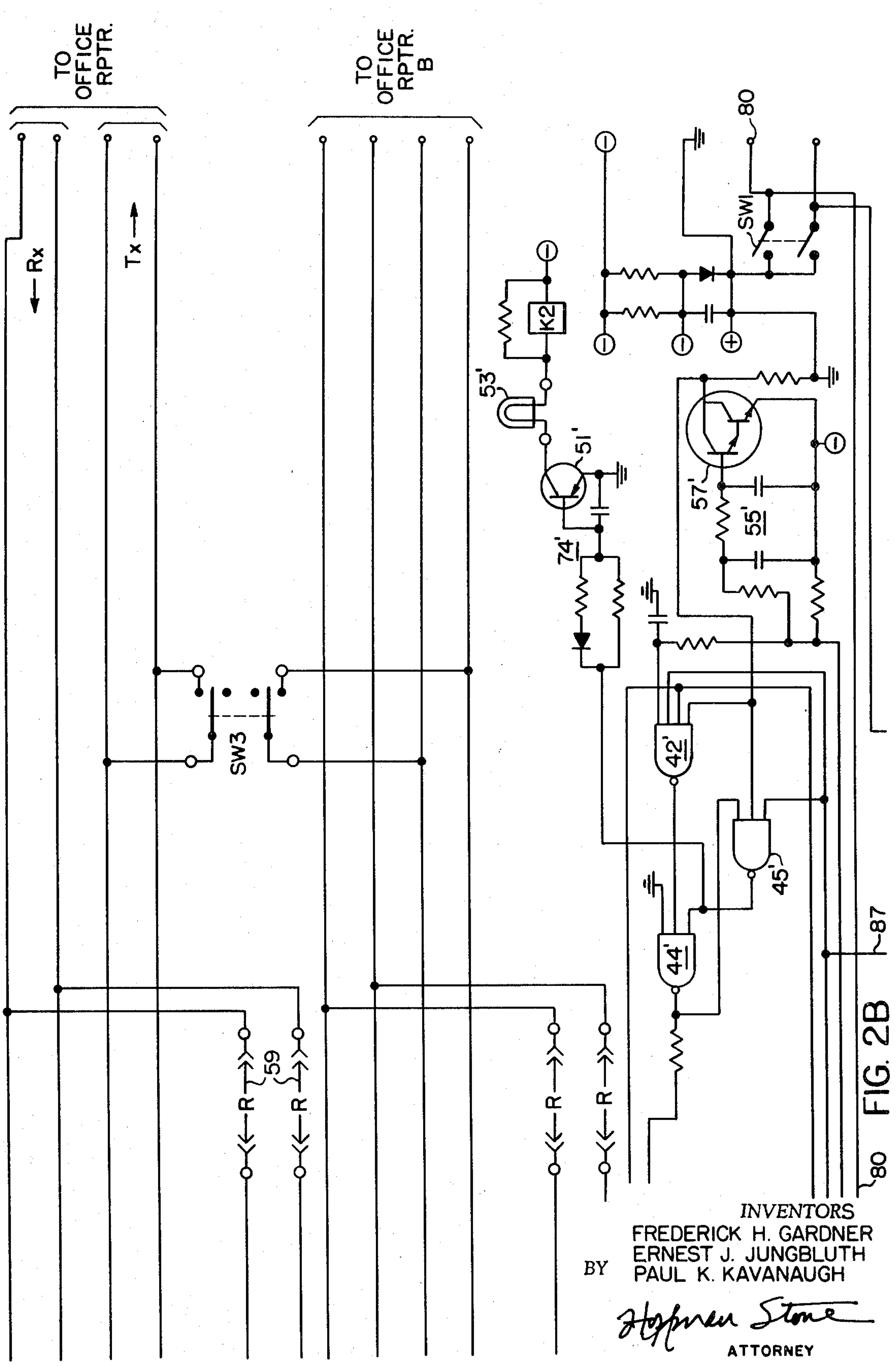
Figure 2C:
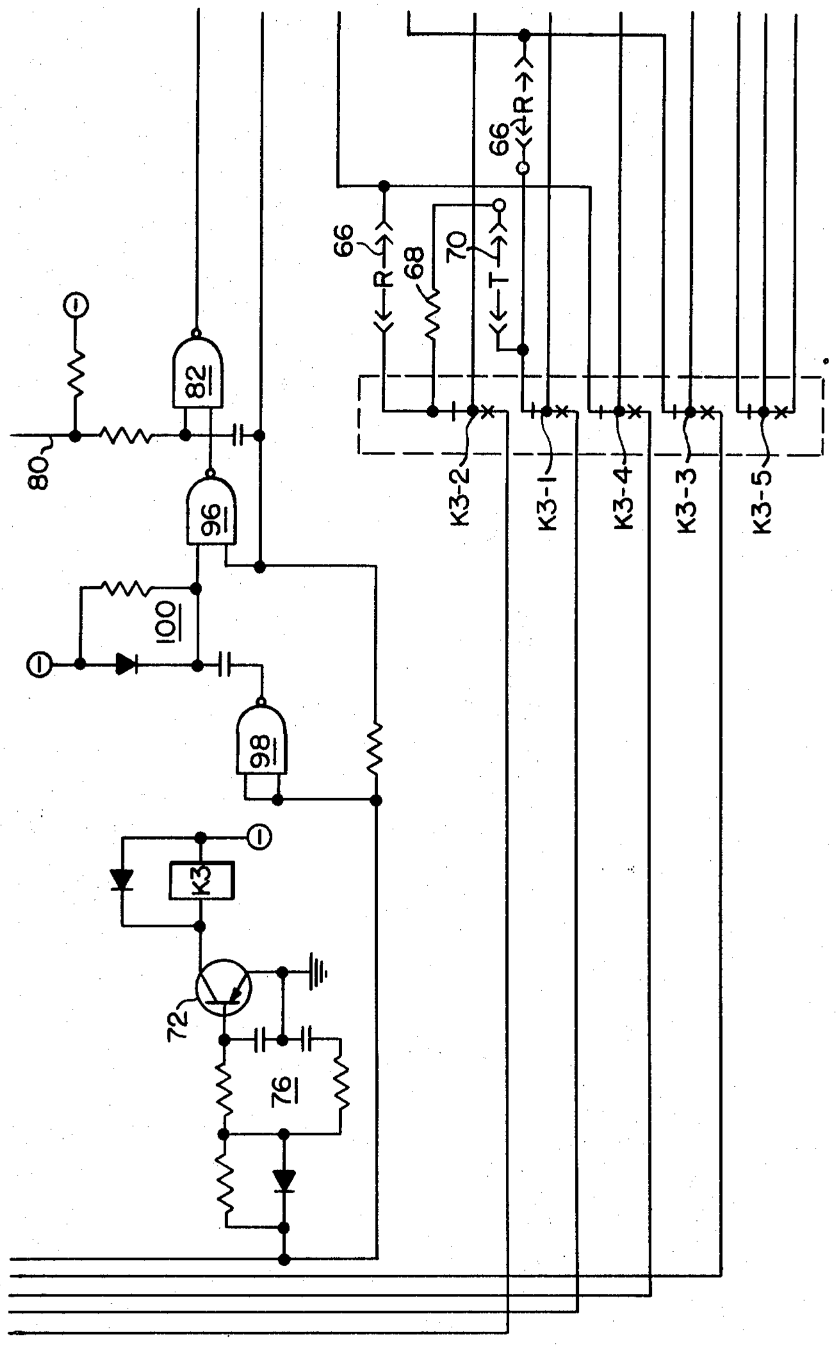
Figure 3:
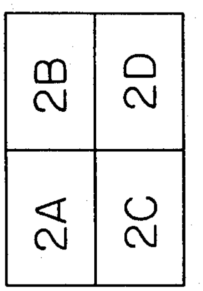
FIG. 3 is a chart showing the arrangement of FIGS. 2A–2D.

The detailed circuit schematic of the logic, referred to hereinafter as an automatic transfer unit, is shown in FIGS. 2A–2D, which should be arranged as indicated in FIG. 3. The circuit is arranged to serve two normal span lines 10 and 11, and may be readily expanded to serve any desired number of normal span lines, as determined in view of traffic requirements and system reliability.

The circuit includes an alarm detector (not generally designated) for each of the normal lines to be served. The detectors are all alike, and only one need be described. A system alarm generated by the terminal common equipment (not shown), for example, is applied at a terminal 40 to enable a gate 42, and through the gate 42 to rigger a bi-stable flip-flop constituted by a pair of gates 44 and 45. One output of the flip-flop 44, 45 is used to drive a BUSY amplifier 47 to prevent seizure of the spare span line by any other normal line. The output of the BUSY amplifier is applied to the BUSY COMMON terminal 49 and a bus 34 to inhibit all of the other detector input gates 42'.

A second output of the flip-flop 44, 45 is applied to the base of a driver amplifier 51 to energize a first main relay K1 and a signal lamp 53 (FIG. 2A).

The system alarm signal is also applied to a timing circuit 55, the output of which drives a lockout amplifier 57 if the alarm signal persists longer than about 1 second or so. The lockout amplifier resets the flip-flop 44, 45, and holds it reset so long as the alarm signal persists. Thus, if the alarm signal continues after the spare line has been substituted for the faulty normal line, the normal line is returned to its normal connection and refused further access to the spare until the fault in the normal line has been cleared.

When the relay K1 picks up, it switches its double throw contacts K1–3, K1–4, K1–5, and K1–6 to disconnect the normal office repeater 22 from the terminal matching unit 14 (FIG. 1A) and to connect the terminal matching unit 14 to the buses 30, 31, 32, and 33. Simultaneously, if the faulty normal line is to be looped upon itself at the local exchange, the output of the receiver of the office repeater 22 is connected to the input of its transmitter through the contacts K1–1 and K1–2 and the R straps 59. This permits trouble shooting to be done from one terminal only without the need for personnel at both terminals. The R straps 59 are omitted at the terminal where trouble shooting is to be done, and the relay contacts K1–1 and K1–2 at that terminal serve no signal directing function except for test purposes.

The second normal signal path B gains access to the spare line through another, exactly similar detector shown in FIG. 2B, the components of which are mostly designated by reference numerals similar to those used in FIG. 2A, but with a prime notation. The main relay for the second normal line is designated K2, and it operates similarly to the first relay K1.

The spare office repeater 23 or 27 at one terminal is normally fed signals from one of the normal terminal matching units 14, 16, 18, or 20 (FIG. 1A) through terminals 61 and 62 (FIG. 2D), T straps 64, and contacts K3–3 and K3–4 of a common main relay K3 (FIG. 2C). The output of the receiver of the office repeater at this terminal is simply terminated by a resistor 68 of the proper value through a T strap 70 and the contacts K3–1 and K3–2 of the relay K3.

At the opposite terminal, the T straps 64 are omitted, and the output of the receiver of the spare office repeater 23 or 27 is fed to the input of its transmitter through R straps 66 and the contacts K3–3 and K3–4.

The common main relay K3 serves to disconnect the spare line from its normal, standby inputs and outputs, and to connect it to the busses 30, 31, 32, and 33. The relay K3 is energized in response to the output of the BUSY amplifier 47 (FIG. 2A) which is applied to the fifth bus 34. The relay K3 is operated in response to the busy signal on the bus 34 by an amplifier 72, which is connected to the bus 34 through an input delay circuit 76, and which serves to energize the relay K3 a short interval following energization of the normal main relay K1 or K2. The main relays K1, K2, and K3 are arranged for delayed release, as by the differential delay circuits 74, 74′, and 76 shown at the inputs to their respective driver amplifiers, to ensure ample time for frame synchronization following switching before the circuit can response to a system alarm signal generated from the spare line.

Identical circuitry is installed at the other end of the route, and operates in the same way, practically simultaneously. If the spare line 11 operates satisfactorily after it is switched into duty service, the system alarm signal disappears from the input terminal 40 or 40′, the main relays K1 or K2, and K3 remain energized, and the other normal line 10 or 12 is denied access to the spare until the logic is reset by manual actuation of a release switch SW–1 (FIG. 2B).

Figure 2D:
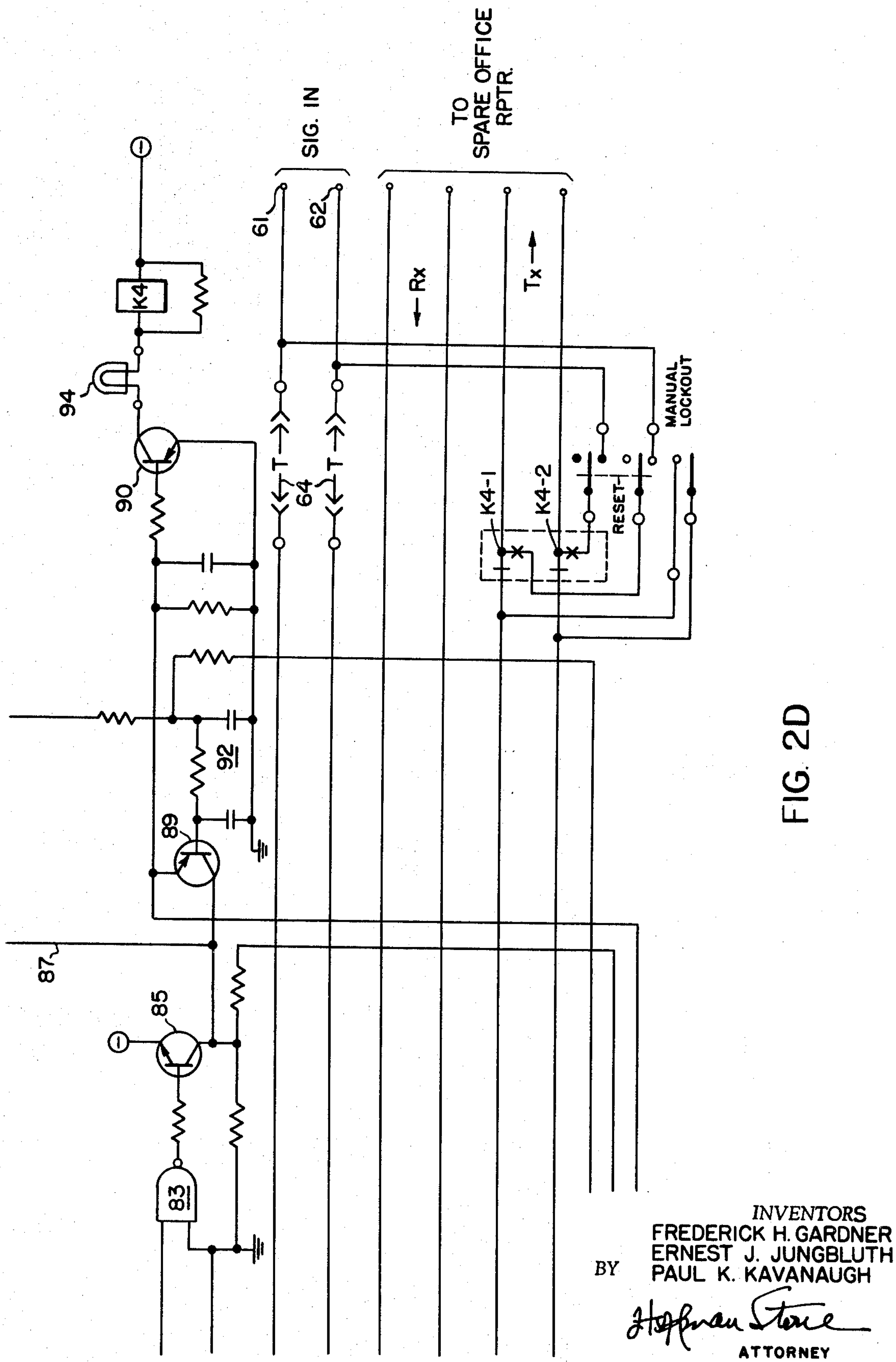

The release of the normal main relay K1 or K2 in response to actuation of the release switch SW–1 is accomplished through a lockout portion of the logic shown in FIGS. 2C and 2D. Actuation of the release switch SW–1 simulates a system alarm generated by the spare terminal matching unit 15 or 19, and the release of the main relay K1 or K2 by the switch may be best understood from the following description of the operation of the lockout circuit.

If a fault occurs in the spare line 11, or parts of the equipment associated with it at any time except for the delay period already noted, a system alarm signal is generated in the spare terminal matching unit 15 or 19, and the lockout circuit operates in response to the alarm signal to reset the system to its normal mode and make the spare line 11 unavailable until the lockout is manually restored to its normal condition.

The operation is initiated in response to the system alarm signal from the spare terminal matching unit 15 or 19, which is applied to an input terminal 80 (FIGS. 2B) and thence through gates 82 and 83 (FIGS. 2C and 2D) to drive an amplifier 85. The output of the amplifier 85 marks the ALARM COMMON lead 87 to reset the flip-flops 44, 45, and 44′, 45′ in the detectors and hold them reset, thereby turning and holding the driver amplifiers 51 and 51′ off and de-energizing or preventing energization of the main relays K1 and K2.

The output of the amplifier 85 is also applied through the double throw contact K3–5 of the common main relay K3 to one or the other of two amplifiers 89 and 90, depending on the condition of the relay K3. If the alarm occurs while the relay K3 is not energized (the spare line is on stand-by), the output of the amplifier is applied through a delay network 92 to the amplifier 89 to drive it after a predetermined interval of, say, a hundred milliseconds or so. If the alarm signal persists at the input terminal 80 for that length of time, the amplifier 89 is driven, and, in turn, it drives the lockout amplifier 90 to energize the lockout relay K4 and the lockout alarm indicator 94.

If the alarm occurs while the spare line 11 is in its duty condition substituting for a normal line, the relay K3 is picked up at the time, and the signal from the first amplifier 85 is applied first to the lockout amplifier 90 to cause the lockout relay K4 to pick up and to remain picked up only for the relatively short interval required for the common main relay K3 to drop. When the main relay K3 drops, the signal from the first amplifier 85 is switched from the lockout amplifier 90 to the delay network 92, and through the network to the amplifier 89, and the lockout relay K4 is again energized at the expiration of the delay.

The delay provided by the network 92 allows the spare line 11 time to be synchronized and the lockout process to be stopped if the spare equipment is in good working order and the alarm signal was due to a malfunction in some other part of the equipment. Disappearance of the alarm signal during the delay interval shuts down the lockout process, and the spare line 11 is returned to its stand-by condition.

Ordinarily, an alarm signal can be expected to appear at the lockout input terminal during and immediately following a transfer operation, that is, immediately after the spare line 11 has been switched from its stand-by to its duty condition, and it may persist for the short interval needed to synchronize the spare line. To allow for the expected alarms, the start of the lockout is delayed for an interval following the start of an alarm signal at the terminal 80 so that the lockout will not come into action during transfer and for a brief interval following it. This is done by inhibiting the input gate 82 for the required interval following the onset of the busy signal on the fifth bus 34. The signal from the bus 34 is applied directly to one input of an inhibit gate 96, and through another gate 98 and a delay network 100 to the second input of the inhibit gate 96. The output of the inhibit gate 96 inhibits the lockout input gate 82 during the interval between the initiation of the busy signal and the timing out of the delay network 100.

Figure 4:
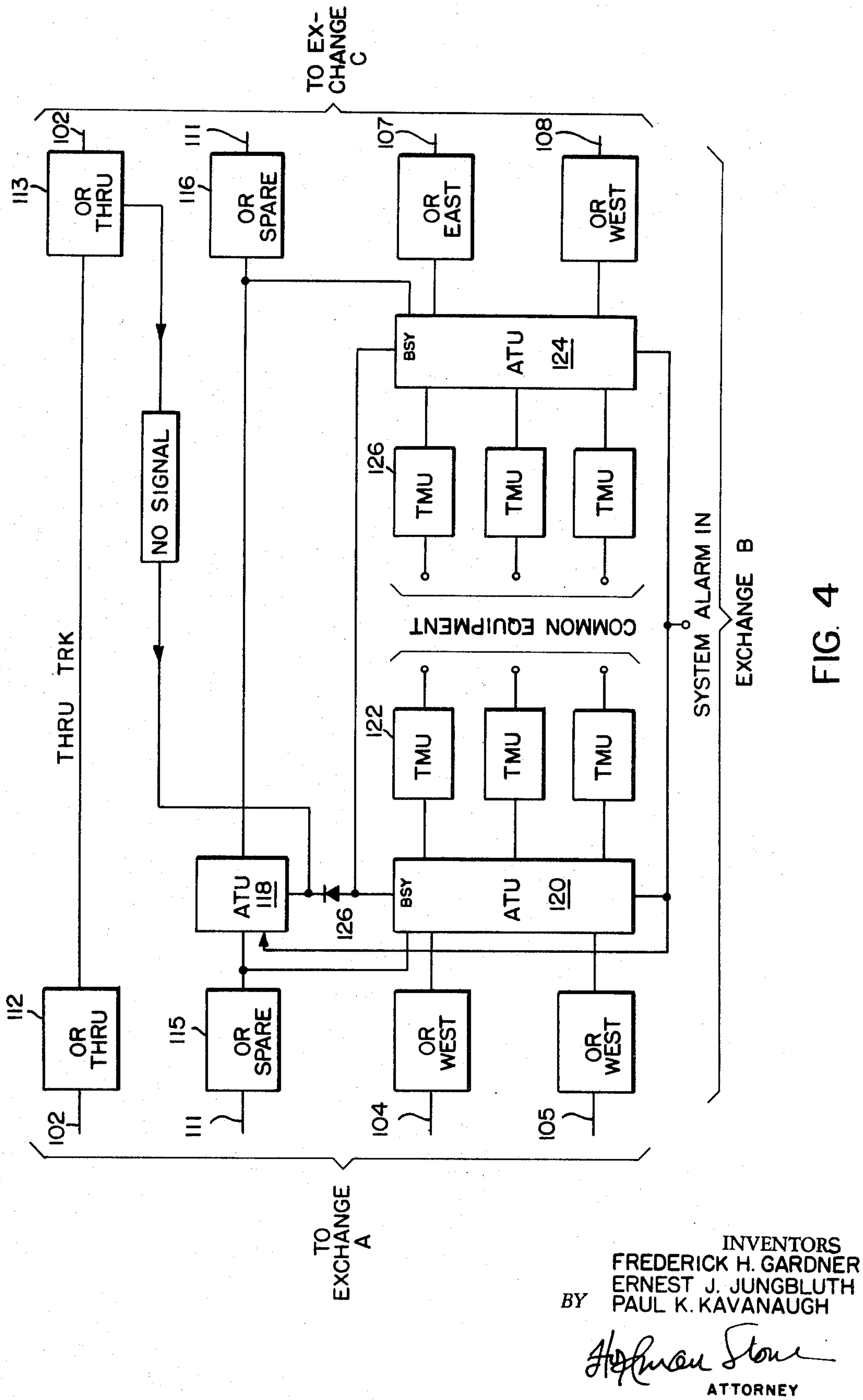
FIG. 4 is a block diagram illustrating a modified form of the invention for use in a signal transmission system comprising a chain of three exchanges in tandem.

FIG. 4 shows an embodiment of the invention arranged to serve a chain of three exchanges A, B, and C, in tandem. For illustrative purposes, only one normal trunk line 102 is shown connecting the exchanges A and C, at the ends of the chain. Two lines 104 and 105 are shown connecting exchange A to exchange B, and two lines 107 and 108 connecting exchange B to exchange C. A single spare line 111 is made available to substitute for any of the normal lines 102, 104, 105, 107, and 108, and without danger of cross-talk.

The problem in designing this arrangement lay in barring access to the spare line 111 under certain circumstances. For example, if the through normal line 102 develops a fault, transfer is effected by the automatic transfer units at the west and east exchanges A and C, respectively, without the need for any action at the intermediate exchange B, but when the spare line 111 is in duty service between exchanges A and C, access to it must be denied to the west and east normal lines 104, 105, 107, and 108.

Similarly, if the west segment of the spare line 111 between exchanges A and B is in duty service substituting for one of the normal lines 104 and 105 on the west segment of the route, access to the spare line must be denied to the through normal line 102.

For line matching purposes, two office repeaters 112 and 113 are connected back-to-back at the intermediate exchange B to serve the through line 102. The spare line 111 is connected also through two office repeaters 115 and 116, and through a normally closed set of contacts in the relay K1 (not shown in FIG. 4) in an automatic transfer unit 118 between the two repeaters 115 and 116. The output of the first spare office repeater 115 is also connected to the spare input of an automatic transfer unit 120 and, through it, to a spare terminal matching unit 122. The output of the second spare office repeater is connected to another automatic transfer unit 124, and, through it, to another terminal matching unit 126.

The automatic transfer unit 120 operates as hereinabove described to serve the two normal lines 104 and 105 on the west segment of the route, and the unit 124 serves the two normal lines 107 and 108 on the east segment.

The busy terminals 49 of the two transfer units 120 and 124 are connected together so that when either one of them is in its transfer condition, the other one is marked busy and thereby made unavailable to go into transfer. Also, the system alarm that riggers the transfer unit 120 or 124 is applied also to the spare transfer unit 118 to operate its relay K1, breaking the connection between the spare office repeaters 115 and 116. When the connection is broken, the segment of the spare line 111 not involved in the transfer at the intermediate exchange is deprived of signals, and it and the transfer unit at the corresponding west or east exchange A or C go into alarm and lockout.

This takes care of denying access to the through line 102 when one segment of the spare line 111 is in duty service. To deny access to the east and west lines 104, 105, 107, and 108 when the spare line 111 is on duty in through service, the "no signal" alarm from one of the normal office repeaters 112 and 113 is applied to the busy terminal 49 of the spare transfer unit 118, and through a diode 126 to the busy terminals of the two regular transfer units 120 and 124. The diode 126 ensures that busy marks from the two regular transfer units 120 and 126 will not reach the spare transfer unit 118 to block access for the east and west lines when the spare line 111 is on stand-by.

What is claimed is:

1. A transfer circuit for use in a multiplex signal transmission system arranged for transmitting pulse code modulated signals between two terminals and including means establishing a normal signal transmission path, means establishing a spare signal transmission path, and alarm means in each of the terminals for generating an alarm signal in response to a fault in signal reception, the transfer circuit being effective in response to an alarm signal from the alarm means to disconnect the normal path means and to connect the spare path means in place of the normal path means, and comprising at each terminal:

a. first switching means for normally connecting signal transmitting and receiving equipment at its terminal to the normal path means,
b. second switching means for normally connecting the spare path means to monitoring equipment at its terminal,
c. first circuit means interconnecting the first and second switching means so that when said switching means are operated the transmitting and receiving equipment at the terminal is connected to the spare path means and disconnected from the normal path means,
d. second circuit means responsive to an alarm signal produced by the alarm means for operating said first and second switching means,
e. third means for continuously monitoring the spare path and for inhibiting operation of said first and second switching means in response to the occurrence and persistence for a predetermined time of a faulty condition in the spare path means, and
f. fourth circuit means to release said first and second switching means at a predetermined interval following their operation if the alarm signal persists and to inhibit said second circuit means pending manual intervention.

2. A transfer circuit for use in a multiplex signal transmission system arranged for transmitting digital signals in both directions between two terminals and including means establishing a plurality of normal signal paths, means establishing a spare signal path, and alarm means in each of the terminals for generating alarm signals in response to faults in signal reception, the transfer circuit being effective in response to an alarm signal to disconnect the one normal signal path and to connect the spare path means in its place, and comprising at each terminal:

a. a set of buses equal in number to the number of conductive paths in each of the path means,
b. first relays, one for each of the normal path means, each having a set of double-throw contacts normally connecting one of the normal path means to respective designated signal transmitting and receiving equipments at its terminal, said contacts disconnecting the respective designated equipments from the normal path means and connecting them to said buses when the relays pick up.
c. an auxiliary relay having a set of double-throw contacts normally connecting the spare path means to monitoring equipment at the exchange and when said auxiliary relay picks up switching the spare path means to said buses,
d. first circuit means responsive to an alarm signal produced by the alarm means for energizing said auxiliary relay and the one of said first relays indicated by the alarm signal and inhibiting energization of all of the other ones of said first relays,
e. second circuit means for deenergizing and inhibiting the one of said first relays energized by said first circuit means if the alarm signal persists for a predetermined interval following energization,
f. third circuit means responsive to operation of said second means to deactuate said first circuit means thereby re-enabling the other ones of said first relays, and g. fourth circuit means for continuously monitoring the spare path means and for inhibiting all of said first relays in response to the occurrence and persistence for a predetermined time of a faulty condition in the spare path means.

3. A transfer circuit as defined in claim 2 including:

strapping means connected to the contacts of said first relays to allow the looping back of the normal path means when the respective one of the first relays picks up to allow fault detection from the other terminal.

* * * * *

UNITED STATES PATENT OFFICE
CERTIFICATE OF CORRECTION

PATENT NO. : 3,715,503
DATED : February 6, 1973
INVENTOR(S) : Ernest J. Jungbluth, et al.

It is certified that error appears in the above-identified patent and that said Letters Patent are hereby corrected as shown below:

Col 3, line 31 "33n/o " should read ---33'---.

Col. 4, line 21 "rigger" should read ---trigger---.

Col. 7, line 35 "riggers" should read ---triggers---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*